June 15, 1948.  M. B. GODDARD  2,443,500
COMPRESSOR CAPACITY CONTROL FOR AIR CONDITIONING SYSTEMS
Filed May 10, 1944
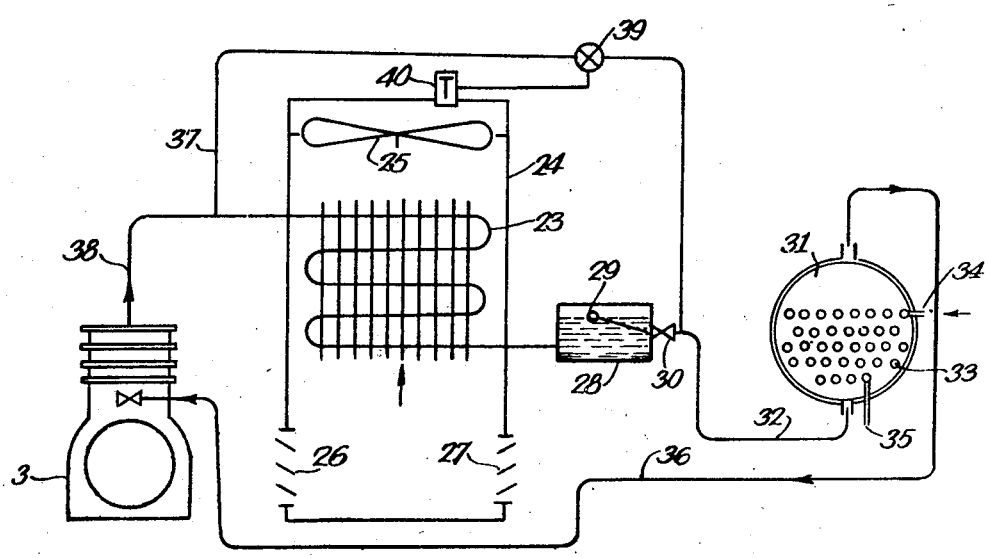
INVENTOR.
Merrill B. Goddard
BY
Herm ___
ATTORNEY Patented June 15, 1948

2,443,500

UNITED STATES PATENT OFFICE 2,443,500

COMPRESSOR CAPACITY CONTROL FOR AIR CONDITIONING SYSTEMS

Merrill B. Goddard, Chicago, Ill., assignor to Carrier Corporation, Syracuse, N. Y., a corporation of Delaware Application May 10, 1944, Serial No. 534,901

1 Claim. (Cl. 62—6)

This invention relates to capacity control arrangements for use more particularly with reciprocating refrigerating machines.

The general object of the invention is to provide by-pass arrangements for modulating the capacity of a reciprocating refrigerant compressor responsive to changes in load conditions or in order to achieve desired refrigerating effect.

A feature of the invention resides in the provision of a by-pass line between the discharge from a compressor and the intake of an evaporator located beyond the refrigerant liquid control valve, so that the heat output of a coil used in a system capable of cooling air under summer operating conditions and heating air under winter conditions may be modulated as desired to suit different heating requirements.

The attached drawing is a diagrammatic view of a system employing a flooded evaporator, the system being capable of cooling air under summer operating conditions and heating air under winter operating conditions.

Considering the drawing, similar designations referring to similar parts, there is shown a system for modulating the heat output of a condenser employed for tempering or heating air. Compressor 3 discharges compressed refrigerant gas to a condenser coil 23 positioned within air conditioning unit 24. Fan 25 pulls air from any desired source or sources through dampers 26, 27. The intaken air passes over coils 23 which, under winter operating conditions, serve as heating coils. Fan 25 then discharges the tempered air either directly or through a duct system into an area to be conditioned. Condensed refrigerant leaving coils 23 will flow into float chamber 28. Float 29 is a liquid level device for controlling the discharge of liquefied refrigerant by opening and closing valve 30 depending upon the level of liquid in chamber 28. The liquefied refrigerant fed through valve 30 enters shell and tube evaporator 31 through line 32. Tubes 33 in evaporator 31 serve to circulate water, from any desired source which enters the nest of tubes through intake line 34 and leaves through discharge line 35. The refrigerant entering evaporator 31 returns in gaseous condition through suction line 36 to compressor 3 to complete the cycle.

In order to modulate the heating capacity of coil 23, applicant provides by-pass line 37 connecting line 38 leading from compressor 3, and line 32 between the float chamber and evaporator. Control valve 39 may be manually regulated or may be controlled automatically. For example, control valve 39 may be regulated by a thermostat in the conditioned area or by a thermostat positioned in the leaving air stream at the discharge side of fan 25. For purposes of illustration, thermostat 40 is shown in the fan discharge, operative responsive to changes in temperature of the air discharged from units 24. Upon an undesirable rise in temperature of the discharged air, thermostat 40 will cause valve 39 to tend to open so that less compressed gas will flow through coil 23 and as a result the capacity of the coil will be reduced and the temperature of the air passing through the unit will tend to drop. Conversely, upon an undesirable drop in temperature, reflected by thermostat 40, valve 39 will tend to close so that a greater proportion of the compressed gas will be directed to coil 23.

With applicant's system, it will be observed that even when the ratio of compressed gas to refrigerant from the float chamber entering evaporator 31 is great, the temperature of the refrigerant will not rise in the evaporator, much if anything, above the water temperature. This is due to the comparatively rapid flow of water through coils 33 which tends to remove the heat from the compressed gas. As a result, the refrigerant gas will at all times be routed to the compressor without superheat in undesirable amounts, so that danger to the compressor due to overheating will be substantially avoided.

It will be appreciated, of course, that the system shown can be readily converted to function under summer operating conditions so that winter condenser 23 will serve as an evaporator under summer conditions while winter evaporator 31 then serves as a condenser. Since this forms no part of the invention, such additional piping for effecting such conversion is not illustrated.

Since many changes can be made in details of design, construction, and method of operation, it is intended that the claim be construed as covering substantial equivalents and not limited to the precise diagrammatic arrangements illustrated.

I claim:

In combination a compressor, a condenser, means for circulating air for heating in contact with said condenser, a float chamber for receiving refrigerant liquefied in the condenser, an evaporator, a refrigerant liquid control valve for controlling the admission of liquid refrigerant from said float chamber into the evaporator, a by-pass for delivering compressed uncondensed refrigerant from the compressor to a point between said valve and the evaporator, a control device for varying the flow of compressed uncondensed refrigerant through the by-pass, said control device being operative upon a rise in temperature of air heated by the condenser to cause an increase in the flow of compressed uncondensed refrigerant through the by-pass.

MERRILL B. GODDARD.

REFERENCES CITED

The following references are of record in the file of this patent:

UNITED STATES PATENTS

| Number | Name | Date |
|---|---|---|
| 2,276,814 | Zwickl | Mar. 17, 1942 |
| 2,344,215 | Soling | Mar. 4, 1944 |

Certificate of Correction

Patent No. 2,443,500.

June 15, 1948.

MERRILL B. GODDARD

It is hereby certified that error appears in the printed specification of the above numbered patent requiring correction as follows: Column 1, line 16, before "conditions" insert the word *operating*; and that the said Letters Patent should be read with this correction therein that the same may conform to the record of the case in the Patent Office.

Signed and sealed this 24th day of August, A. D. 1948.

[SEAL]

THOMAS F. MURPHY,
*Assistant Commissioner of Patents.*